United States Patent [19]

Young et al.

[11] Patent Number: 5,480,087
[45] Date of Patent: Jan. 2, 1996

[54] FASTENER FEEDING APPARATUS

[75] Inventors: Alfred Young; Fred E. Church, both of Hickory, N.C.

[73] Assignee: Design Tool, Inc., Conover, N.C.

[21] Appl. No.: 300,791

[22] Filed: Sep. 2, 1994

[51] Int. Cl.⁶ ..................................................... B65H 5/00
[52] U.S. Cl. ........................... 227/112; 227/119; 227/139; 221/68; 221/268; 221/296
[58] Field of Search ..................................... 227/112, 119, 227/138, 139, 120, 130; 29/809; 221/268, 68, 296

[56] References Cited

U.S. PATENT DOCUMENTS

| | | |
|---|---|---|
| 1,263,794 | 4/1918 | Neff ......................................... 227/112 |
| 2,273,268 | 2/1942 | Hunter et al. . |
| 2,657,404 | 11/1953 | Kasper . |
| 2,855,600 | 10/1958 | Campbell, Jr. et al. ................. 227/112 |
| 3,061,147 | 10/1962 | Vilmerding . |
| 3,305,155 | 2/1967 | Willis ....................................... 227/112 |
| 3,526,743 | 9/1970 | Spisak . |
| 4,856,389 | 8/1989 | Weber . |
| 5,004,141 | 4/1991 | Young et al. . |
| 5,014,876 | 5/1991 | Young et al. . |

Primary Examiner—Scott A. Smith
Attorney, Agent, or Firm—Bell, Seltzer, Park & Gibson

[57] ABSTRACT

A fastener feeding apparatus which is adapted for concurrently feeding a plurality of fasteners to respective driving machines, and wherein the fasteners are fed from a vibratory hopper along a single delivery chute to a slide assembly. Upon movement of the slide assembly in a loading direction, the fasteners are loaded into individual slots on the slide assembly, and upon return movement of the slide assembly to a dump position, the loaded fasteners are concurrently released into respective discharge tubes which lead to the fastener driving devices.

11 Claims, 6 Drawing Sheets

FASTENER FEEDING APPARATUS

BACKGROUND OF THE INVENTION

The present invention relates to a fastener feeding apparatus which is adapted for concurrently feeding a plurality of fasteners to respective driving devices.

In many manufacturing operations, it is conventional to mount several automatic screwdrivers on a common frame, which is periodically advanced to engage a workpiece and so that several screws can be simultaneously driven into the workpiece. Heretofore, the screws have been delivered to each of the screwdrivers by a separate feeding apparatus which typically includes a vibrating feed hopper and feed assembly as described for example in U.S. Pat. No. 5,004, 141. The required number of such feeding apparatus is costly, and they occupy a significant amount of space which is not always available.

To reduce the number of required feed hoppers, and thus the cost of the feeding apparatus, it has been proposed to provide the bowls with up to three fastener delivery chutes coming off at different locations about the periphery of the hopper, but this arrangement is limited to a small number of delivery chutes which can be mounted on the bowl without interfering with its operation.

It is accordingly an object of the present invention to provide a single fastener feeding apparatus which is able to reliably and economically delivery fasteners to a plurality of driving devices.

It is a more particular object of the present invention to provide a fastener feeding apparatus which has the capability of delivering fasteners to each of a plurality of driving devices, and which requires only a single vibratory feed hopper and a single fastener delivery chute leading from the feed hopper.

It is also an object of the present invention to provide a fastener feeding apparatus which is capable of receiving a plurality of fasteners from a single delivery chute, and then carrying the fasteners to a release or dump position where they are simultaneously released into respective discharge tubes which lead to the driving devices.

SUMMARY OF THE INVENTION

The above and other objects and advantages of the present invention are achieved in the embodiment illustrated herein by the provision of a fastener feeding apparatus which comprises a housing having a pair of parallel, longitudinally extending side wall members, opposite end wall members, and a bottom plate. These components define a longitudinal channel extending between the end wall members. A plurality of discharge openings are positioned in the bottom plate of the housing which are disposed in a longitudinally spaced apart arrangement, and a fastener delivery chute extends laterally through one of the side wall members of the housing at a medial location along its length. A slide assembly is mounted for longitudinal reciprocation in the channel and between a dump position and a ready position, and the slide assembly comprises means for receiving and retaining fasteners from the delivery chute in a longitudinally spaced apart arrangement on the slide assembly during movement of the slide assembly from the dump position to the ready position, with the longitudinally spaced apart arrangement matching that of the discharge openings in the bottom plate. The slide assembly also acts to retain the fasteners in the longitudinally spaced apart arrangement during movement from the ready position to the dump position, and to concurrently release the fasteners upon the slide assembly reaching the dump position, so that the fasteners concurrently fall through respective ones of said discharge openings.

The apparatus further comprises a source of pressurized air, and air delivery line means connected to the air source for directing a stream of air into the fastener delivery chute during movement of the slide from the dump position to the ready position and thereby assisting the delivery of fasteners along the chute and to the slide assembly.

The apparatus further comprises a delivery tube connected to each of the discharge openings and leading to a work station, and which receives the fastener which falls through the discharge opening. An air discharge line is positioned in each discharge opening and is connected to the air source for introducing air into each of the delivery tubes concurrently with the initiation of an operating cycle of the apparatus, so that the fastener in the delivery tube from the previous cycle is blown into the driving machine.

In the preferred embodiment, the slide assembly comprises an elongate bar extending longitudinally within the channel and having a side face facing toward but spaced from the one side wall member, the side face having a plurality of grooves disposed therein in a longitudinally spaced apart arrangement matching that of the discharge openings in the bottom plate. The slide assembly also comprises a slide plate extending longitudinally within the channel between the side face of the bar and the one side wall member of the housing, the slide plate having a plurality of slots extending laterally therethrough and which are disposed in a longitudinally spaced apart arrangement matching that of the discharge openings in the bottom plate.

Also, the slide assembly comprises means interconnecting the bar and the slide plate so as to permit limited relative longitudinal movement therebetween and between a first position wherein the slots are aligned with respective ones of the grooves and a second position wherein the slots and grooves are non-aligned, and spring biasing means interposed between the bar and the slide plate so as to be compressed when the bar and the slide plate are in the first position and so as to bias the same toward the second position.

BRIEF DESCRIPTION OF THE DRAWINGS some of the objects and advantages of the present invention having been stated, others will appear as the description proceeds, when taken in conjunction with the accompanying drawings, in which.

DETAILED DESCRIPTION OF THE PREFERRED EMBODIMENT

Figure 1:
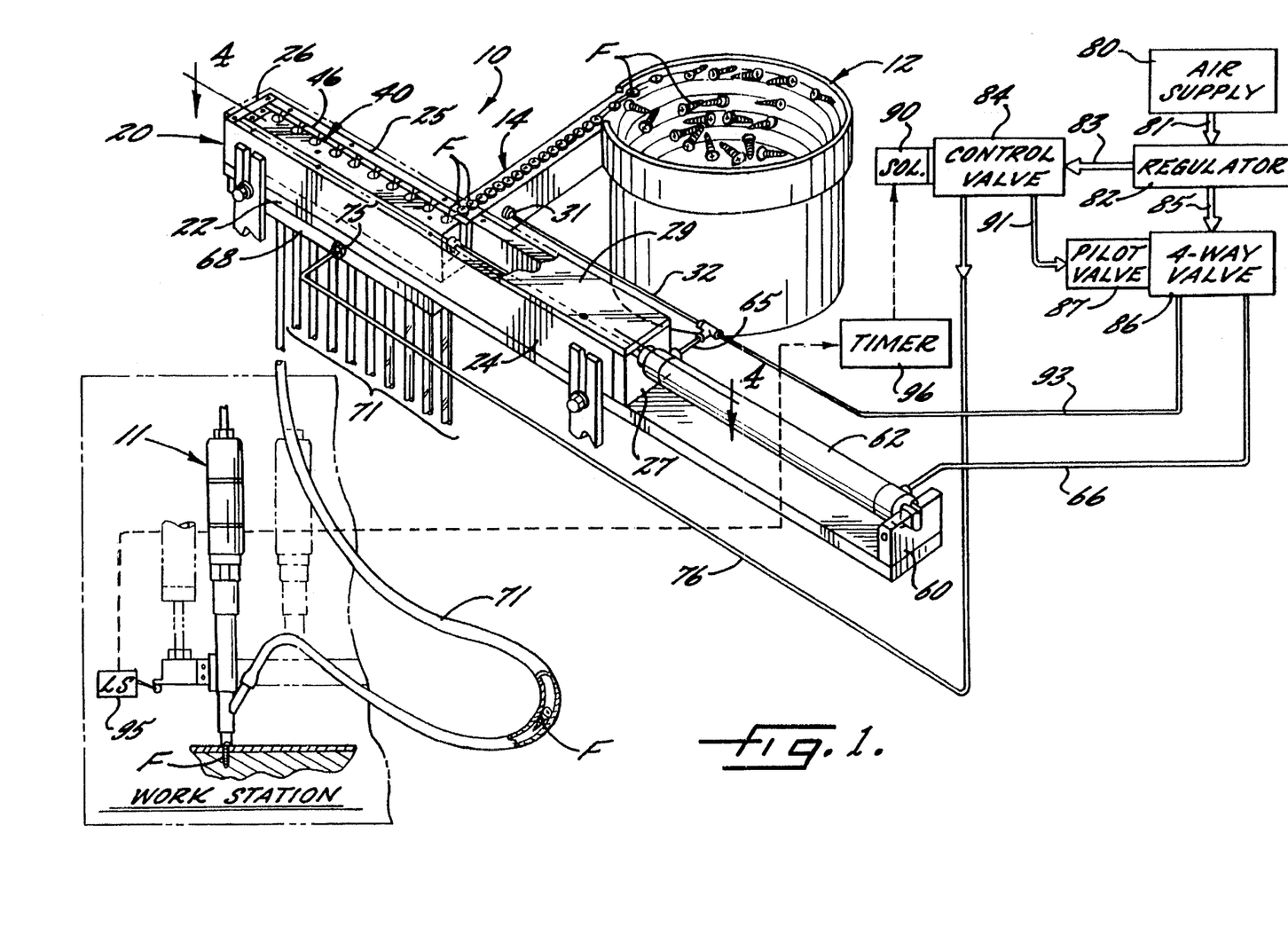
FIG 1 is a somewhat schematic perspective view of a fastener feeding apparatus in accordance with the present invention.

Referring more particularly to the drawings, FIG. 1 illustrates a fastener feeding apparatus 10 which embodies the present invention, and which is adapted to feed a plurality of fasteners F to each of a plurality of automatic screwdrivers 11 at a work station. In FIG. 1, a single screwdriver 11 is illustrated, but it will be understood that the illustrated embodiment of the present invention is adapted to simultaneously feed the fasteners to up to ten such screwdrivers. Automatic screwdrivers of the described type are conventional, and a screwdriver of this type is sold by Design Tool, Inc. of Conover, N.C. as Model No. DTI 5000.

Figures 5, 6, 7, 8:
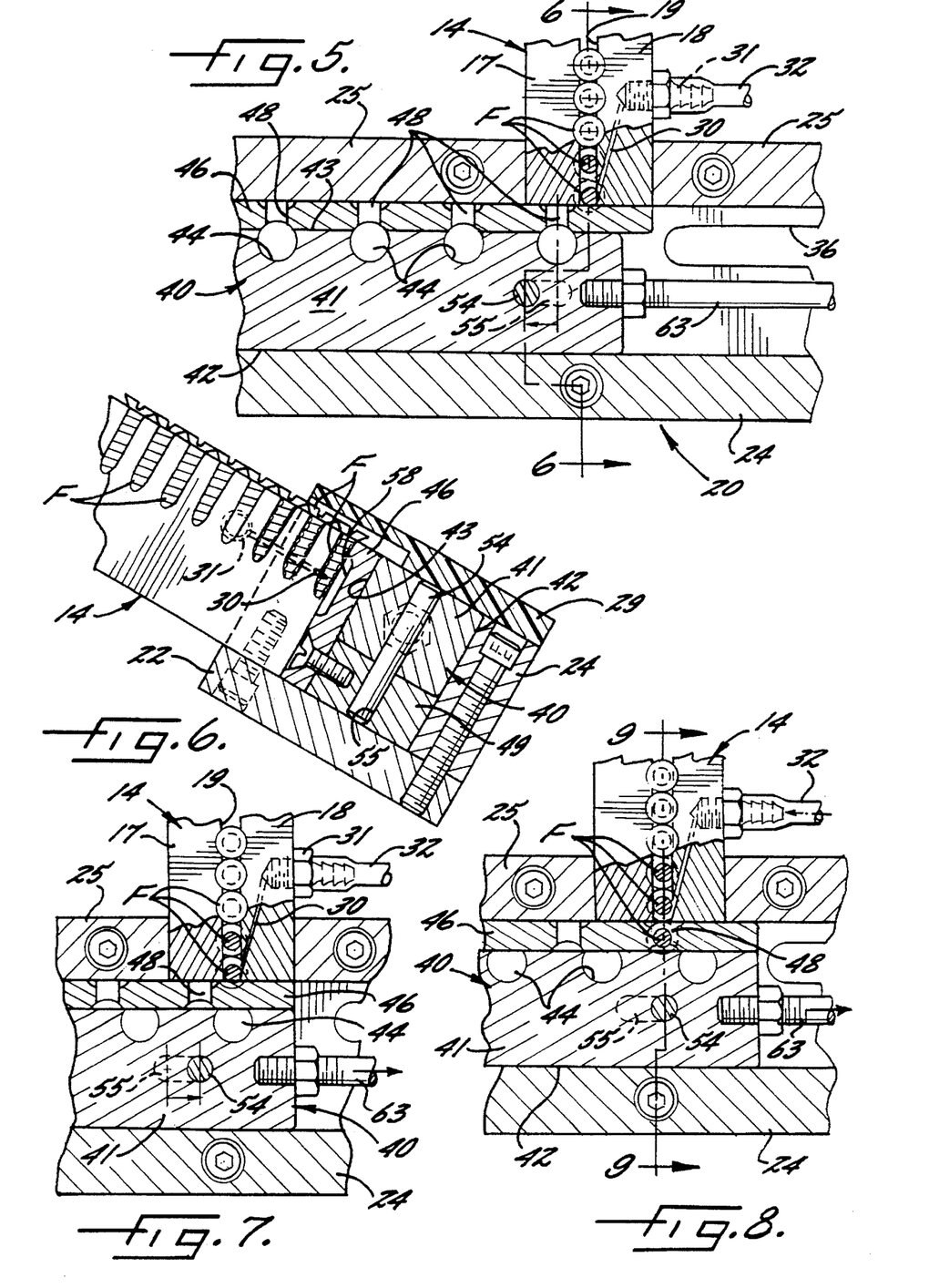
FIG. 5 is a fragmentary and enlarged view of a portion of the housing and fastener delivery chute, as shown in FIG. 4A, and with the slide assembly in the dump position.
FIG. 6 is a sectional view taken substantially along the line 6—6 of FIG. 5.
FIGS. 7 and 8 are similar to FIG. 5, but illustrating the slide assembly during the initial portion of its movement toward the ready position, and further illustrating is FIG. 8 the positioning of one of the fasteners in a slot of the slide plate.
Figures 9, 10, 11:
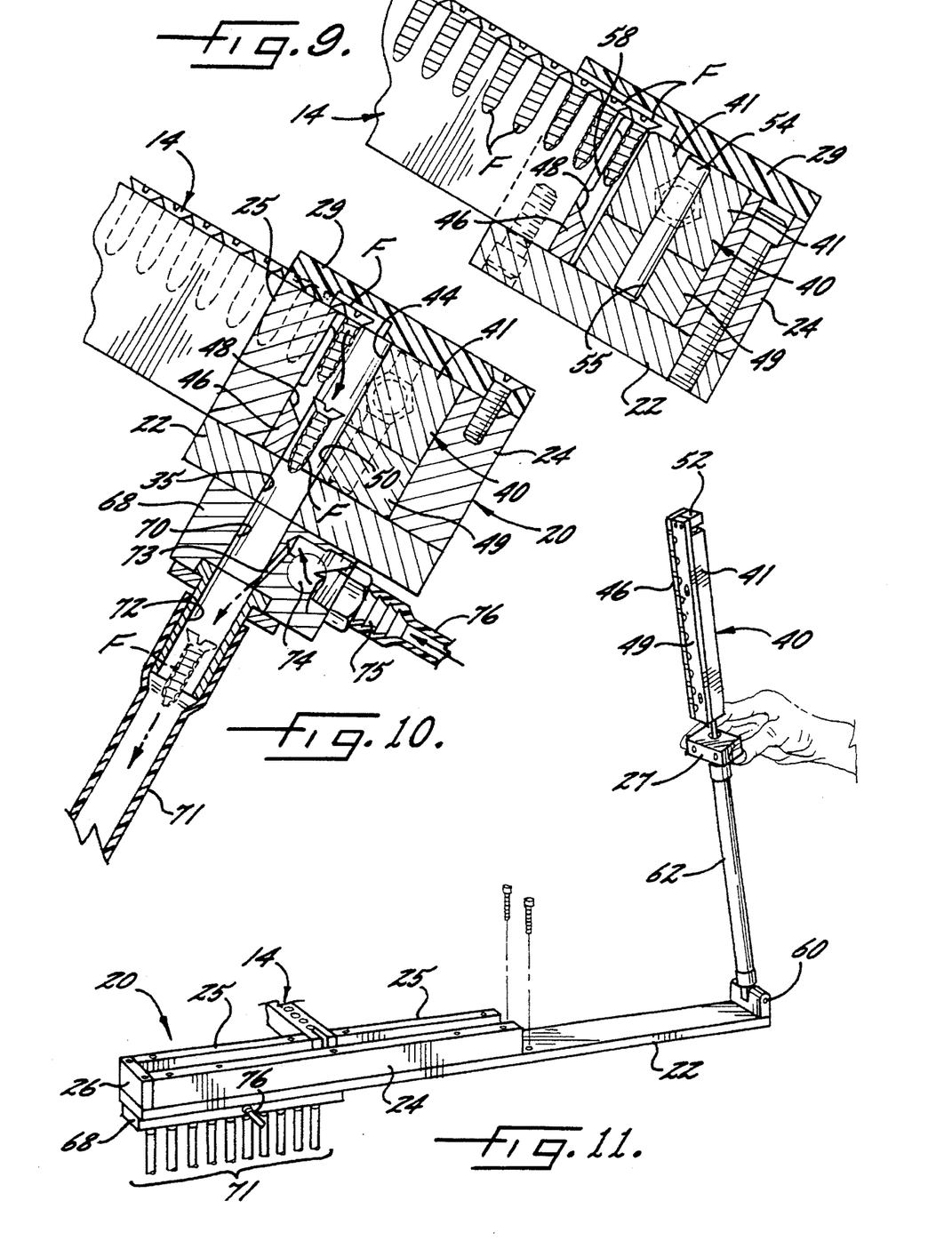
FIG. 9 is a sectional view taken substantially along the line 9—9 of FIG. 8.
FIG. 10 is a sectional view taken substantially along thee line 10—10 of FIG. 4C.
FIG. 11 is a fragmentary perspective view of the feeding apparatus of the present invention and illustrating the slide assembly and pneumatic cylinder in a raised position to facilitate cleaning and servicing of the apparatus.

The apparatus 10 comprises a vibrating hopper 12 of conventional design, and which is adapted to deliver the fasteners F serially along a delivery chute 14. As best seen in FIGS. 6 and 9, the delivery chute 14 is inclined downwardly, and it is composed of a base plate 15 (FIG. 2) and two side plates 17 and 18 which are laterally spaced apart so as to define a slot 19 therebetween for slidably receiving a line of the fasteners F. The slot 19 is sized for receiving the shanks of the illustrated threaded fasteners F, and the upper surfaces of the two side plates support the heads of the depending fasteners, note for example FIG. 6.

The apparatus 10 further comprises a housing 20 which is composed of an elongate bottom plate 22, a pair of laterally spaced apart and longitudinally extending side wall members 24, 25 which are joined to the bottom plate, and a pair of opposite end wall members 26, 27 which are also joined to the bottom plate. These components define a longitudinal channel extending between the end wall members 26, 27. The housing 20 also includes a top cover plate 29, which is joined to the side wall members 24, 25, so as to protectively cover the channel. The top cover plate 29 may be composed of a transparent plastic material so as to permit the interior of the channel and the operation of the apparatus to be visually observed.

The fastener delivery chute 14 extends laterally through the side wall member 25 of the housing at a medial location along its length, and thus communicates with the channel.

As best seen in FIG. 5, the delivery chute 14 also includes an internal air delivery line 30 which is connected via a coupler 31 to an external tube 32 which delivers pressurized air to the line 30 in a manner further described below. The line 30 is inclined so as to have a significant component in the direction of the slot 19 and it communicates with the slot at a point immediately adjacent its outlet end, for the purposes further described below.

Figures 2, 3:
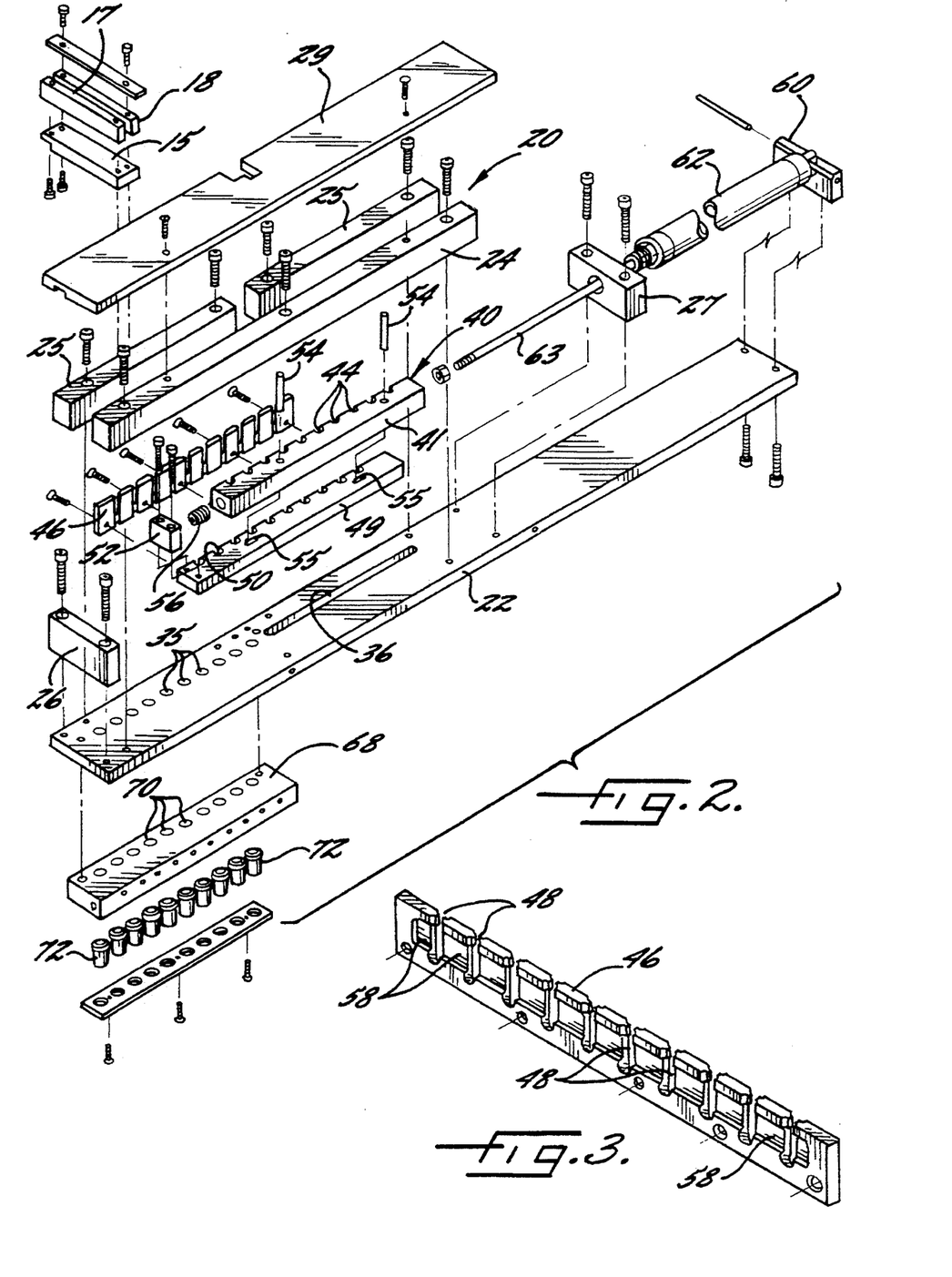
FIG. 2 is an exploded perspective view of the feeding apparatus of the present invention.
FIG. 3 is a perspective view of the slide plate of the apparatus.

A plurality of discharge openings 35 extend through the bottom plate 22 of the housing and are disposed in a longitudinally spaced apart arrangement. Also, a jam escape slot 36 is positioned in the bottom plate and extends longitudinally from one end of the line of discharge openings 35 as best seen in FIG. 2.

Figure 4A:
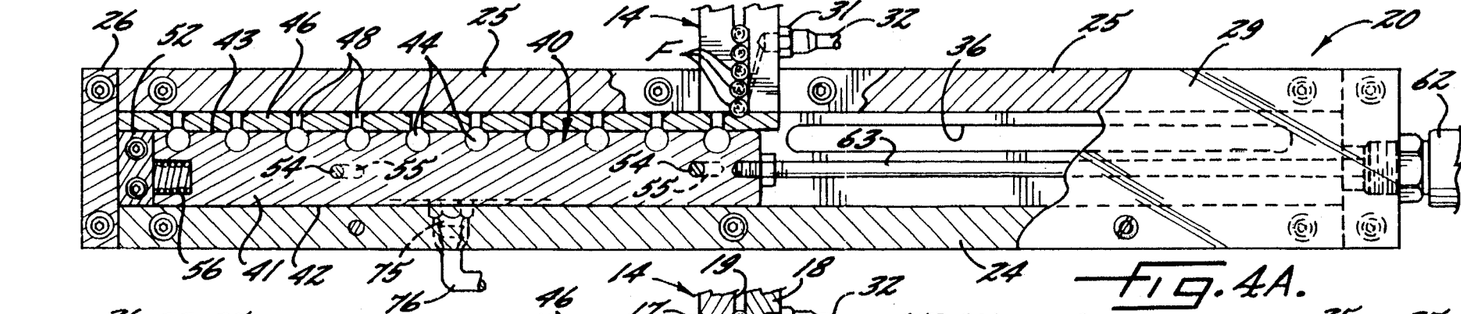
FIGS. 4A–4C are sectional plan views taken along the line 4—4 in FIG. 1, and illustrating the slide assembly in the dump position at the initiation of a cycle of operation, the ready position, and the dump position at the instant the fasteners are dropped into the delivery tubes, respectively.
Figure 4B:
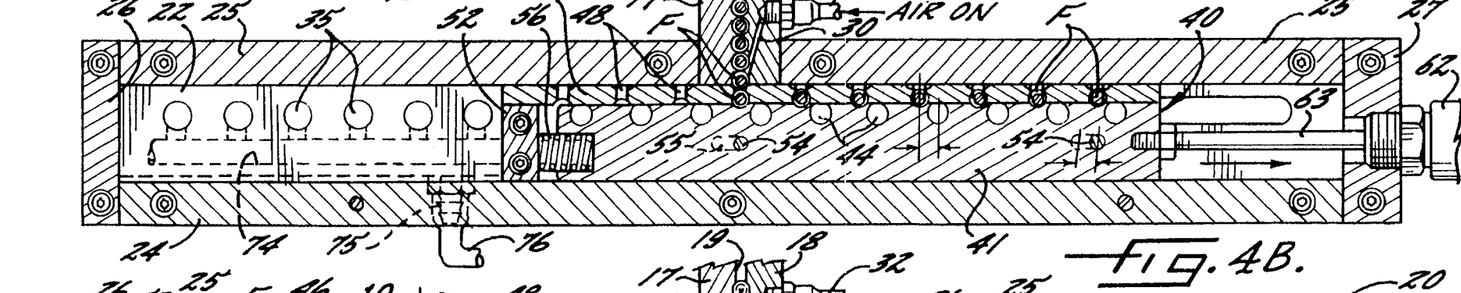

A slide assembly 40 is mounted for longitudinal reciprocation in the channel and between a dump position (FIG. 4A) and a ready position (FIG. 4B). As best seen in FIG. 2, the slide assembly 40 comprises an elongate rectangular bar 41 extending longitudinally within the channel and having a side face 42 (FIG. 6) disposed immediately adjacent the side wall member 24 of the housing, and an opposite side face 43 which faces toward but is spaced from the other side wall member 25. The side face 43 has a plurality of grooves 44 disposed therein in a longitudinally spaced apart arrangement which matches that of the discharge openings 35 in the bottom wall plate 22 of the housing.

The slide assembly 40 further includes a slide plate 46 which extends longitudinally within the channel between the side face 43 of the bar 41 and the side wall member 25 of the housing. The slide plate 46 has a plurality of slots 48 extending laterally therethrough and which are disposed in a longitudinally spaced apart arrangement which matches that of the discharge openings 35 in the bottom plate 22. The slide plate 46 is also joined to a base plate 49 which underlies the bar 41 and which includes grooves 50 in one side face which are aligned with the slots 48 of the slide plate 46. Also, an end post 52 is fixed to both the slide plate 46 and the base plate 49.

Figure 4C:
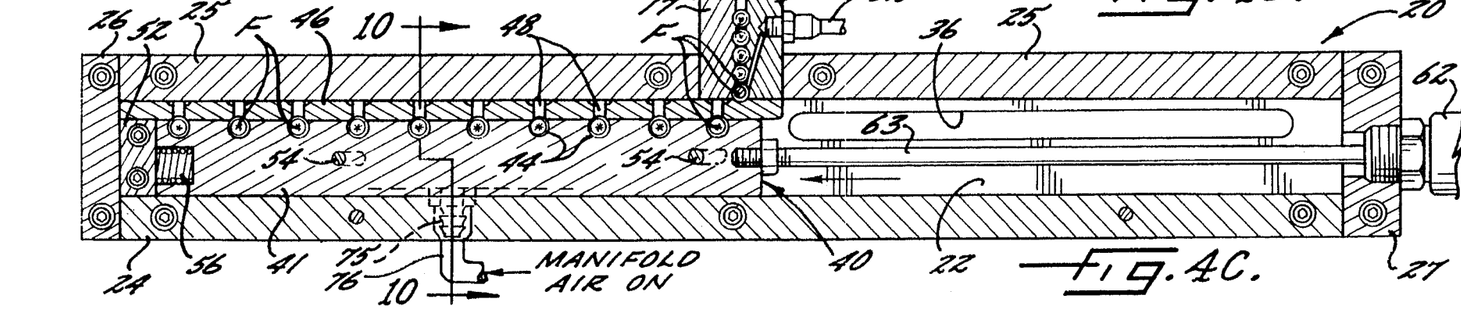

The bar 41 and the slide plate 46 are interconnected so as to permit limited relative longitudinal movement therebetween and between a first position (note FIGS. 4A and 4C) wherein the slots 48 are aligned with respective ones of the grooves 44 and a second position (note FIG. 4B) wherein the slots and grooves are non-aligned. The interconnection includes a pair of vertical dowels 54 which are fixed to the bar and which extend into slots 55 (FIG. 2) in the base plate 49. Thus the bar 41 and the slide plate 46 are adapted to move longitudinally relative to one another a distance equal to the length of the slots 55. A spring 56 is interposed between the bar 41 and the end post 52 so as to be compressed when the bar 41 and slide plate 46 are in the first position and so as to bias the same toward the second position.

As best seen in FIGS. 3 and 6, the side wall of the slide plate 46 which is disposed adjacent the side wall member 25 of the housing includes a longitudinal relief 58, which assures adequate clearance for the stems of the fasteners F between the slide plate 46 and the side wall member 25 of the housing, and thereby avoids jamming of the fasteners during reciprocation of the slide assembly.

The bottom plate 22 of the housing 20 extends longitudinally beyond the end wall member 27, and the extended portion mounts a mounting post 60 which in turn pivotally mounts one end of a pneumatic cylinder 62. The output shaft 63 of the cylinder 62 is connected to the bar 41 of the slide assembly, so that operation of the cylinder 62 acts to reciprocate the assembly 40 between the dump and ready positions. The cylinder 62 is operated by a pressurized air delivery system which includes an entry line 65 communicating with the left end of the cylinder as seen in FIG. 1, and a second entry line 66 communicating with the right end of the cylinder.

A manifold plate 68 is mounted below the left end of the bottom plate 22, note FIG. 2, and the manifold plate includes longitudinally spaced apart openings 70 which are aligned and communicate with the discharge openings 35 of the bottom plate. A fastener delivery tube 71 is connected to the lower end of each opening 70 via a sleeve coupling 72 (FIG. 10), and the manifold plate 68 also includes an air discharge line 73 which communicates with the interior of each opening 70. More particularly, each air discharge line 73 receives pressurized air from a manifold which includes a longitudinal internal bore 74 which extends along one side of the openings 70, and which communicates with each of the air discharge lines 73. Also, a coupling 75 connects the bore 74 to an air delivery line 76 which periodically receives pressurized air in the manner further described below. Each air discharge line 73 in the manifold plate 68 is inclined downwardly, so that the air entering from the air discharge line passes downwardly into the opening 70 and the associated fastener delivery tube 71.

The operation of the apparatus is controlled by an air delivery control system as illustrated schematically in FIG. 1. The control system includes a source 80 of pressurized air, and an outlet line 81 for delivering the air to a regulator 82 of conventional design. The regulator 82 in turn has a first outlet line 83 leading to a control valve 84, and a second outlet line 85 which leads to a conventional four-way valve 86 and associated pilot valve 87. The control valve 84 is controlled by a solenoid 90, and has an outlet line 91 leading to the pilot valve 87, and a second outlet which forms the line 76 leading to the coupling 75 on the manifold plate 68.

The four-way valve 86 has two outlet lines, with the first outlet line forming the entry line 66 leading to the right end of the pneumatic cylinder 62 as seen in FIG. 1, and a second line 93 leading to the entry line 65 at the left end of the cylinder 62 and also to the line 32 leading to the coupling 31 on the fastener delivery chute 14.

The four-way valve 86 is configured to always maintain pressure in one of the lines 66 and 93, and in its neutral condition, the pressure is maintained in the line 66 so that the cylinder 62 holds the slide assembly in its dump position.

A switch 95 is provided at the work station, which is operable either manually or automatically upon actuation of the screwdriver, and which acts through a timer 96 and the solenoid 90 to actuate the control valve 84.

Operation of the Apparatus

During operation of the apparatus, the vibratory hopper 12 is energized so as to cause the fasteners F to be serially delivered into the slot 19 of the delivery chute 14.

Prior to the initiation of an operating cycle, the apparatus is configured with the slide assembly 40 in its dump position by reason of the pressure which is maintained in the line 66, and a fastener F will be present in each delivery tube 71 as seen in FIG. 1 by reason of the previous cycle of operation.

When the switch 95 is closed, thereby calling for a fastener to be delivered to each screwdriver 11, a signal is delivered to the timer 96, which immediately actuates the solenoid 90, causing the control valve 84 to deliver air to the bore 74 of the manifold plate 68 via the line 76, thereby causing the fastener which is in each delivery tube 71 to be blown into its associated screwdriver 11. Also, activation of the solenoid 90 supplies air to the pilot valve 87, causing the four-way valve 86 to be thrown to deliver air to the line 93, thereby causing the pneumatic cylinder 62 to move the slide assembly 40 from the dump position to the ready position.

Air is also then delivered into the line 32, which leads to the fastener delivery chute 14.

During movement of the slide assembly 40 from the dump position to the ready position, the slide plate 46 moves across the outlet end of the fastener delivery chute 14, and a fastener is loaded into each slot 48 in the manner best seen in FIGS. 7 and 8. The fact that the fastener delivery chute 14 is inclined downwardly (note FIG. 6), and the fact that an airstream is being delivered into the downstream end of the slot 19 of the chute 14 from the line 76, serve to assure that a fastener is delivered into each slot 48 of the slide plate 46.

When the timer 96 expires, which typically corresponds to the time when the slide assembly 40 reaches the ready position, a signal is sent to deactivate the solenoid 90, causing the four-way valve 86 to return to its original position, so that air is delivered to the line 66 causing the slide assembly 40 to move from its ready position to its dump position. The pressure in the line 76 leading to the manifold plate 68 is also released. The timer 96 is adjustable, and it will accordingly be seen that adjustment of the timer duration will effectively permit adjustment of the number of fasteners being loaded into the slots 48 of the slide plate 46. For example, a shortening of the timer duration may be set so that the slide assembly 40 will not reach its maximum ready position, and a predetermined number of fasteners less than the maximum of ten in the illustrated embodiment, will be loaded during movement of the slide assembly toward its ready position. Thus the apparatus of the present invention may be easily adapted to serve a selected number of screwdrivers 11, between one and ten in the illustrated embodiment. Such adjustment may also be effected by physically blocking the movement of the slide assembly beyond a certain distance, such as by placing a block (not shown) between the slide assembly 40 and end wall member 27.

The speed of movement of the slide assembly 40 toward the dump position can be increased as compared to the speed in the loading direction, by providing for an increased pressure in the line 66. Thus the lines 66 and 93 may include suitable regulators (not shown) to selectively control the pressures, and thereby control the speed of movement during each direction of movement.

Upon reaching the dump position, the slide assembly 40 engages the end wall member 26, causing the slide plate 46 to move longitudinally with respect to the bar 41, and so that the slots 48 of the slide plate 46 are aligned with the grooves 44 of the bar 41. The fasteners then concurrently fall into the grooves 44, note FIG. 10, and then fall through the discharge openings 35 and openings 70 which are aligned with the grooves 44. The fasteners then enter the fastener delivery tubes 71, where they come to rest awaiting the next cycle of operation.

FIG. 11 illustrates a feature of the apparatus which permits it to be readily cleaned and serviced. In particular, the cover plate 29 may be easily removed, and the end member 27 may be disconnected from the bottom plate 22, which permits the slide assembly 40 and the pneumatic cylinder 62 to be pivoted as a unit upwardly from the bottom plate 22 and about the axis of the mounting post.

Figure 12:
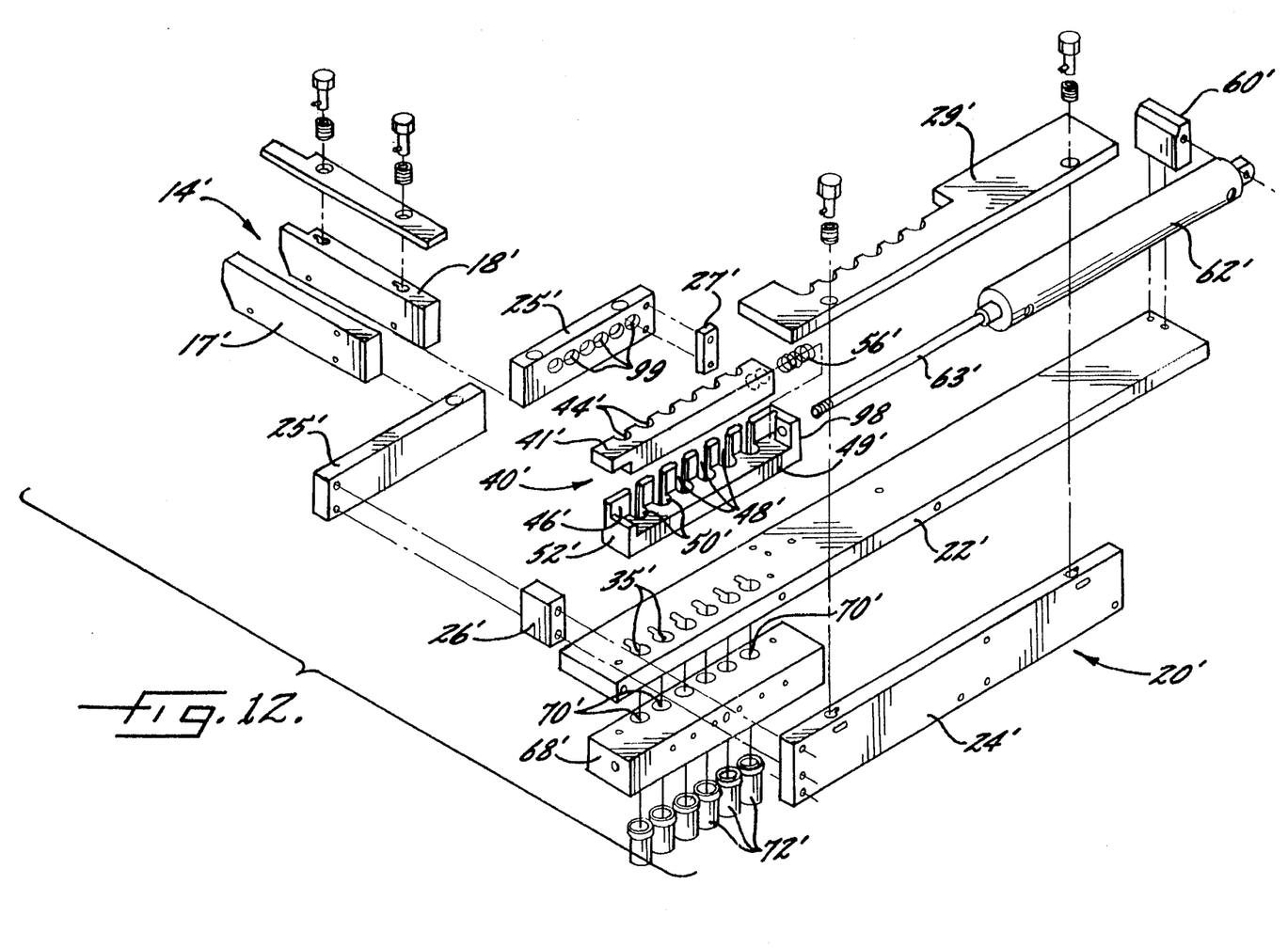
FIG. 12 is a view similar to FIG. 2, but illustrating a second embodiment of the invention.

FIG. 12 illustrates a second embodiment of the invention, which is designed to feed a maximum of six fasteners with each cycle of operation. The components in the embodiment of FIG. 12 which correspond to the components of the initial embodiment described above are indicated with the same numeral and a prime.

In the embodiment of FIG. 12, it will be seen that the slide plate 46', the base plate 49', and the end post 52' of the slide assembly 40', are formed integrally. Also, the bar 41' has an end portion, at the left as seen in FIG. 12, which extends over and beyond the end post 52' so as to be adapted to directly engage the end wall member 26' in the dump position. Further, the output shaft 63' of the cylinder 62' is connected to an end wall 98 at the right end of the slide assembly, and the spring 56' is interposed between the end wall 98 and the bar 41'.

The operation of the embodiment of FIG. 12 is identical to that of the initially described embodiment. In particular, in the dump position, the left end of the bar 41' is in engagement with the end wall 26', causing the spring 56' to be compressed, and upon movement toward the ready position the spring 56' acts to slide the bar 41' leftward with respect to the integral slide plate 46' and base plate 49'.

To permit the length of the stroke of the slide assembly 40' to be controlled, there are provided a number of transverse bores 99 in the right hand portion of the side wall member 25'. Each bore 99 mounts a slidable plunger which is controlled by an air cylinder (not shown) so that a selected plunger may be extended into the path of the slide assembly 40' and thereby limit the extent of its movement toward the ready position. Thus a selected number of fasteners, up to a maximum of six, may be loaded and delivered upon each cycle of operation.

In the drawings and specification, there has been disclosed a typical preferred embodiment of the invention and, although specific terms are employed, they are used in a generic and descriptive sense only and not for purposes of limitation, the scope of the invention being set forth in the following claims.

That which is claimed:

1. A fastener feeding apparatus adapted for concurrently feeding a plurality of fasteners to respective driving machines, and comprising a housing having a pair of parallel, longitudinally extending side wall members, opposite end wall members, and a bottom plate, and so as to define a longitudinal channel extending between said end wall members, a plurality of discharge openings in said bottom plate of said housing and which are disposed in a longitudinally spaced apart arrangement, a fastener delivery chute extending laterally through one of said side wall members of said housing at a medial location along its length, a slide assembly mounted for longitudinal reciprocation in said channel and between a dump position and a ready position, said slide assembly comprising means (a) for receiving and retaining fasteners from said delivery chute in a longitudinally spaced apart arrangement on said slide assembly during movement of said slide from said dump position to said ready position, with the longitudinally spaced apart arrangement matching that of said discharge openings in said bottom plate, (b) for retaining the fasteners in said arrangement during movement from said ready position to said dump position, and (c) for concurrently releasing the fasteners upon said slide assembly reaching said dump position so that the fasteners fall through respective ones of said discharge openings.

2. The apparatus as defined in claim 1 further comprising a source of pressurized air, and air delivery line means connected to said air source for directing a stream of air into said fastener delivery chute during movement of said slide assembly from said dump position to said ready position and thereby assisting the delivery of fasteners along said chute and to said slide assembly.

3. The apparatus as defined in claim 2 further comprising a delivery tube connected to each of said discharge openings and leading to a work station, and air discharge line means connected to said air source for introducing air into each of said delivery tubes substantially concurrently with the initiation of the movement of said slide assembly from said dump position toward said ready position.

4. A fastener feeding apparatus adapted for concurrently feeding a plurality of fasteners to respective driving machines, and comprising a housing having a pair of parallel, longitudinally extending side wall members, opposite end wall members, and a bottom plate, and so as to define a longitudinal channel extending between said end wall members, a plurality of discharge openings in said bottom plate of said housing and which are disposed in a longitudinally spaced apart arrangement, a fastener delivery chute extending laterally through one of said side wall members at a medial location along its length, a slide assembly mounted for longitudinal reciprocation in said channel and between a dump position and a ready position, said slide assembly comprising (a) an elongate bar extending longitudinally within said channel and having a side face facing toward but spaced from said one side wall member, said side face having a plurality of grooves disposed therein in a longitudinally spaced apart arrangement matching that of said discharge openings in said bottom plate, (b) a slide plate extending longitudinally within said channel between said side face of said bar and said one side wall member of said housing, said slide plate having a plurality of slots extending laterally therethrough and which are disposed in a longitudinally spaced apart arrangement matching that of said discharge openings in said bottom plate, (c) means interconnecting said bar and said slide plate so as to permit limited relative longitudinal movement therebetween and between a first position wherein said slots are aligned with respective ones of said grooves and a second position wherein said slots and grooves are non-aligned, and (d) spring biasing means interposed between said bar and said slide plate so as to be compressed when said bar and said slide plate are in said first position and so as to bias the same toward said second position, actuator means for selectively moving said slide assembly between said dump and ready positions, and such that in said dump position said slide assembly contacts one of said end wall members of said housing to cause said bar and said slide plate to assume said first position, and such that upon movement of said slide away from said dump position said spring biasing means acts to bias said bar and said slide plate to said second position, whereby in operation said slide assembly may be moved from said dump position to said ready position by said actuator means, with fasteners being serially loaded into said slots of said slide plate upon passing said fastener delivery chute, and said slide may then be moved to said dump position where said slots, grooves, and discharge openings become respectively aligned to cause the loaded fasteners to be transferred into respective grooves and then dropped through respective discharge openings.

5. The apparatus as defined in claim 4 further comprising a source of pressurized air, and air delivery line means connected to said air source for directing a stream of air into said fastener delivery chute during movement of said slide from said dump position to said ready position and thereby assisting the delivery of fasteners along said chute and to said slide assembly.

6. The apparatus as defined in claim 5 further comprising a delivery tube connected to each of said discharge openings and leading to a work station, and air discharge line means connected to said air source for introducing air into each of said delivery tubes substantially concurrently with the initiation of the movement of said slide assembly from said dump position toward said ready position.

7. The apparatus as defined in claim 6 wherein said actuator means comprises a pneumatic cylinder having opposite ends which are operatively connected to said air source via a control valve means.

8. The apparatus as defined in claim 7 wherein said pneumatic cylinder is pivotally mounted to said bottom plate of said housing so as to permit said slide assembly and said pneumatic cylinder to be pivoted away from said housing to facilitate cleaning and servicing of the apparatus.

9. The apparatus as defined in claim 7 wherein said control valve means acts to alternately maintain pressure at opposite ends of said pneumatic cylinder.

10. The apparatus as defined in claim 4 further comprising vibratory hopper means for supporting a plurality of fasteners and serially delivering the same to said fastener delivery chute.

11. The apparatus as defined in claim 4 further comprising means for adjusting the length of the stroke of the reciprocation to permit adjustment of the number of fasteners being loaded into the slots of said slide plate.

* * * * *